United States Patent [19]

Knierim et al.

[11] Patent Number: 5,600,352
[45] Date of Patent: Feb. 4, 1997

[54] APPARATUS AND METHOD FOR CONTROLLING COALESCENCE OF INK DROPS ON A PRINT MEDIUM

[75] Inventors: David L. Knierim, Wilsonville; Mark R. Parker, Portland, both of Oreg.

[73] Assignee: Tektronix, Inc., Wilsonville, Oreg.

[21] Appl. No.: 267,061

[22] Filed: Jun. 27, 1994

[51] Int. Cl.⁶ .................. B41J 2/145; B41J 2/15; B41J 23/00
[52] U.S. Cl. .................................. 347/40; 347/37
[58] Field of Search .................. 347/40, 13, 14, 347/37, 41, 99

[56] References Cited

U.S. PATENT DOCUMENTS

| | | |
|---|---|---|
| 4,889,560 | 12/1989 | Jaeger et al. . |
| 4,889,761 | 12/1989 | Titterington et al. . |
| 4,967,203 | 10/1990 | Doan et al. . |
| 4,999,646 | 3/1991 | Trask . |
| 5,070,345 | 12/1991 | Lahut et al. . |
| 5,075,689 | 12/1991 | Hoisington et al. . |
| 5,092,235 | 3/1992 | Rise . |
| 5,170,416 | 12/1992 | Goetz et al. . |
| 5,239,312 | 8/1993 | Merna et al. . |
| 5,426,457 | 6/1995 | Raskin .................... 347/37 |
| 5,427,461 | 6/1995 | Hirai et al. ................ 347/37 |

FOREIGN PATENT DOCUMENTS 0476860  8/1991  European Pat. Off. ......... B41J 2/205

*Primary Examiner*—Benjamin R. Fuller
*Assistant Examiner*—Thinh Nguyen
*Attorney, Agent, or Firm*—Ralph D'Alessandro; Richard Preiss

[57] ABSTRACT

An image transfer ink-jet printer (10) employs an image receiving drum (12) that rotates relative to a ink-jet array print head (26) spanning the full width of the drum. An encoder disk (70) is coupled to the drum to coordinate ink drop ejection with precise angular rotational increments of the drum. The encoder disk has an alternating transparent/opaque pattern with a pitch that is one-half the desired resolution of the printer. A photo-optical detector (72) senses the alternating pattern and sends an asymmetrical signal to a duty-cycle correction circuit (140) that generates a symmetrical signal having a frequency double the one received from the photo-optical detector. The symmetrical signal is processed by a dot clock circuit (180) that applies programmable time delays to selected ones of the dot clock pulses (122, 124) to produce ink drop positioning patterns (130, 132) that control the coalescence of adjacent ink drops (80) without reducing overall printer resolution or producing undesired image artifacts. The coalesced ink drops (100) have a shape suitable for depositing multiple ink layers that produce well saturated color images in transparency projection applications.

22 Claims, 5 Drawing Sheets

APPARATUS AND METHOD FOR CONTROLLING COALESCENCE OF INK DROPS ON A PRINT MEDIUM

TECHNICAL FIELD

This invention relates to ink-jet printers and more particularly to an apparatus and method for placing phase change ink drops on media, including paper and transparency film, in patterns conducive to good color saturation and rectilinear light transmission.

BACKGROUND OF THE INVENTION

The field of ink-jet printing is replete with references describing solutions to problems associated with placing ink drops on a print medium. In particular, color ink-jet printing requires careful placement of ink drops to meet print resolution and color fidelity requirements without producing undesired printing artifacts such as banding, streaking, bleeding, puddling, and chroma shifting.

Ink drop placement-related problems vary in severity with a large number of printer-related variables including desired printing speed, print head array configurations, bidirectional versus unidirectional printing, transfer versus direct printing, aqueous versus phase change ink, the printing resolution required, print postprocessing employed, if any, and the type of print medium employed.

Solutions to the above-mentioned problems are often associated with particular sets of printing techniques, such as: print interlacing to avoid banding and streaking artifacts; dithering patterns to improve printed image color gamut and grey scale; ink color laydown patterns to reduce bleeding and puddling; ink color laydown sequences to compensate for printing direction and color shifts; ink drops sizes and cross-sectional profiles adapted for particular print medium types and print processing techniques; specialized print media compatible with particular inks; and print postprocessing to improve printed image durability, appearance, and projectability.

Many prior print interlacing methods and print head nozzle array patterns are known because of the correspondingly wide variety of nozzle array configurations, ink types, print media supports, print head and media movement mechanisms employed by ink-jet printers. Interlacing methods may be further classified into band and line interlacing methods.

Color band interlacing refers to the partial overlapping of a first printed band of a color with a subsequent printed band of the same color. This also requires line interlacing and results in the spacing apart of any printing defects due, for example, to a defective ink jet in an array of ink jets.

Line interlacing entails printing adjacent lines of dots of a particular color during sequential scans of the print head. For example, lines 1, 3, 5, etc., are printed during a first scan, and lines 2, 4, 6, etc., are printed during the next scan. In a bidirectional printer, it is desirable to print during both scanning directions. Line interlacing causes any printing errors and related image defects that are dependent on the scanning direction to be generated at a high spatial frequency that is the inverse of the spacing between lines. Such defects are not easily perceived by a human eye.

It is also known that the ink color laydown sequence is important and depends on print head scanning direction, ink composition, and time between depositing successive drops. To reduce hue-related printing artifacts, ink laydown sequences should always be the same regardless of scan direction. If this is not possible, an alternative is to alternate the ink laydown sequences on adjacent lines so that the resulting hue variations will have a high spatial frequency that is not easily perceived by the human eye.

In some instances, prior workers have sought solutions to a common printing problem but have reached contradictory solutions. For example, when printing with phase change ink, some workers teach that print quality is optimized when adjacent ink drops are allowed to melt together, or coalesce, and other workers teach that adjacent ink drops should not coalesce.

Teaching that adjacent ink drops should coalesce is found in U.S. Pat. No. 5,075,689 issued Dec. 24, 1991 for BIDIRECTIONAL HOT MELT INK JET PRINTING, which describes a phase-change ink-jet printer in which printed color hue is dependent on the order in which inks are deposited one on top of the other. If a first colored ink drop is deposited and a second colored ink drop is deposited on top of the first drop, a particular color is created. But if the ink color laydown sequence is reversed, a slightly different color is created. The patent proposes depositing both drops in such a short time period that they remain in a liquid state that allows their colors to mix together prior to setting. However, this solution is not satisfactory for all phase-change inks, especially those having high chromaticity. Moreover, because pairs of liquid drops that coalesce form a larger resultant drop than that in which the second drop is deposited on top of a set drop, color hue shift effects are still noticeable.

The contradictory teaching is found in U.S. Pat. No. 5,070,345 issued Dec. 3, 1991 for INTERLACED INK JET PRINTING which characterizes many of the banding and seaming problems associated with phase-change ink-jet printing and describes guidelines for minimizing those problems by preventing adjacent ink drops from-coalescing. The guidelines state that banding can be minimized if adjacent dot rows are not printed during the same pass, and each dot row should be deposited between either unprinted adjacent dot rows or deposited between adjacent printed dot rows. Thereby, printing artifacts caused by ink blending and thermal unbalance problems are minimized.

Other workers have proposed ink drop laydown patterns as solutions to particular print quality problems. For example, U.S. Pat. No. 4,967,203 issued Oct. 30, 1990 for INTERLACE PRINTING PROCESS and U.S. Pat. No. 4,999,646 issued Mar. 12, 1991 for METHOD FOR ENHANCING THE UNIFORMITY AND CONSISTENCE OF DOT FORMATION PRODUCED BY COLOR INK JET PRINTING describe color liquid ink-jet printing methods in which predetermined ink drop patterns are employed to reduce liquid ink bleeding, coalescence, hue shift, and banding problems on transparency, plain paper, and special media. The patents describe staggering and alternating the ink drop laydown patterns such that overlapping liquid ink dots are allowed to dry because they are printed on alternate passes of a print head. Also described are "super pixels" of four pixels each whereby printed color hue is improved by employing predetermined ink color laydown and drying sequences for each super pixel.

Another ink drop laydown pattern is described in European Pat. Application No. 0 476 860 A2 published Mar. 25, 1992 for INK DROP PLACEMENT FOR IMPROVED IMAGING in which liquid ink-jet images are improved by printing groups of adjacent drops as clusters of overlapping ink drops that uniformly coalesce toward the center of each cluster. The ink drop cluster pattern substantially eliminates random ink drop coalescence that causes a mottled image. Such mottling is particularly observable when printing on transparency films.

Still other workers have proposed image postprocessing as a solution to transparency print quality problems. In particular, phase change ink-jet printing on transparency film causes individual ink drops to solidify into a lens-like shape that disperses transmitted light rays, resulting in a very dim projected image. This problem is generally solved by postprocessing the phase change ink image with some combination of temperature and pressure to flatten the ink drops. For example, U.S. Pat. No. 4,889,761 issued Dec. 26, 1989 for SUBSTRATES HAVING A LIGHT-TRANSMISSIVE Phase change INK PRINTED THEREON AND METHODS FOR PRODUCING SAME, which is assigned to the assignee of this application, describes passing a print medium through a nip formed between two rollers at a nip pressure of about 3,500 pound/inch$^2$ ("psi") to flatten the ink drops and fuse them into the pores and fibers of the print medium. Controlled pressure in the nip flattens the ink drops into a pancake shape to provide a more light-transmissive shape and to achieve a degree of drop spreading appropriate for the printer resolution. The roller surfaces may be textured to emboss a desirable reflective pattern into the fused image. Unfortunately, such rollers are expensive, bulky, may provide nonuniform fusing pressure, and can cause print medium deformations.

Printing on transparency film also suffers from ink-related problems. The dye concentration in many inks are limited by environmental and health concern-induced regulations. For transparent inks, such as phase change inks, a dye concentration suitable for adequately color-saturated plain paper images will produce a half saturated, washed-out appearing image on transparency film. This is because with plain paper, light passes through the image, reflects off the paper and back through the image, making two passes through the ink whereas with transparency film light makes a single pass through the ink. A prior solution is to print the transparency image twice to increase the color saturation. Unfortunately, such multilayer phase change ink images are unsuitable for use because the secondary colors are distorted, bumpy, have ink strands, and multiple pixel displacements that occur during transfer printing or image postprocessing.

Multilayer printing with phase change inks is also a problem on nontransparent print media because of secondary color bands that result from poor registration of overlayed ink drops. For example, a blue primary color is produced by exactly registering a drop of magenta ink and a drop of cyan ink. To the degree the drops are misregistered, the nonoverlapping portions of the magenta and cyan ink drops will be visible.

Clearly, the above-described mix of problems has a large number of prior solutions, some of which are contradictory and that depend on the particular combination of printing technology employed.

What is needed, therefore, is a color ink-jet printing apparatus and method that provide high color-saturation image printing on transparency film and other print media without visible color shifts, image artifacts, or significant light dispersal, and without requiring image postprocessing.

SUMMARY OF THE INVENTION

An object of this invention is, therefore, to provide an improved apparatus and a method that prints substantially light-transmissive multilayer phase change ink images on transparency film and on nontransparent media with high color saturation.

Another object of this invention is to provide an apparatus and a method that prints high-quality phase change ink images without requiring image postprocessing.

A further object of this invention is to provide an apparatus and a method that alters the addressable positioning and the pre-transfer shape and size of jetted phase change ink drops forming an image.

A still further object of this invention is to provide an apparatus and a method that reduces the sensitivity to dot-on-dot primary color placement when subtractively printing secondary colors.

Accordingly, this invention provides controllable ink drop positioning offsets that cause adjacent pairs of phase change ink drops deposited by an ink-jet print head onto a print medium to coalesce prior to cooling to form a resultant ink drop shape suitable for reducing color artifacts in multilayer printing and transparency projection applications.

In an embodiment of this invention, an image transfer ink-jet printer employs an image receiving drum that rotates relative to a phase change ink-jet array print head spanning the full width of the drum. An encoder disk that is coupled to the drum coordinates ink drop ejection with precise angular rotational increments of the drum. The encoder disk has an alternating transparent/opaque pattern with a pitch that is one-half the desired resolution of the printer. A photo-optical detector senses the alternating pattern and sends an asymmetrical signal to a duty-cycle correction circuit that generates a symmetrical signal having a frequency double the one received from the photo-optical detector. The symmetrical signal is further processed by a dot clock circuit.

Conventional dot clock circuits produce a symmetrical, 50 percent duty-cycle, dot clock signal that causes ink drops to be deposited on a print medium in a regular grid pattern. However, a dot clock of this invention varies the duty cycle of the dot clock such that even-numbered dot clock pulses are time delayed on all scan lines to produce a regular but asymmetrically spaced ink drop positioning pattern that controls ink drop coalescence without reducing the overall printer resolution or producing undesired image artifacts.

In another embodiment, the dot clock duty cycle is varied such that even-numbered dot clock pulses are time delayed on even-numbered scan lines and odd-numbered dot clock pulses are time delayed on odd-numbered scan lines to produce a staggered and asymmetrically spaced ink drop positioning pattern that controls ink drop coalescence.

The coalesced ink drops have a shape that is conducive to multilayer color printing without undue physical distortion of the ink drops and, hence, the printed image.

Additional objects and advantages of this invention will be apparent from the following detailed description of preferred embodiments thereof that proceed with reference to the accompanying drawings.

DETAILED DESCRIPTION OF PREFERRED EMBODIMENTS

Figure 1:
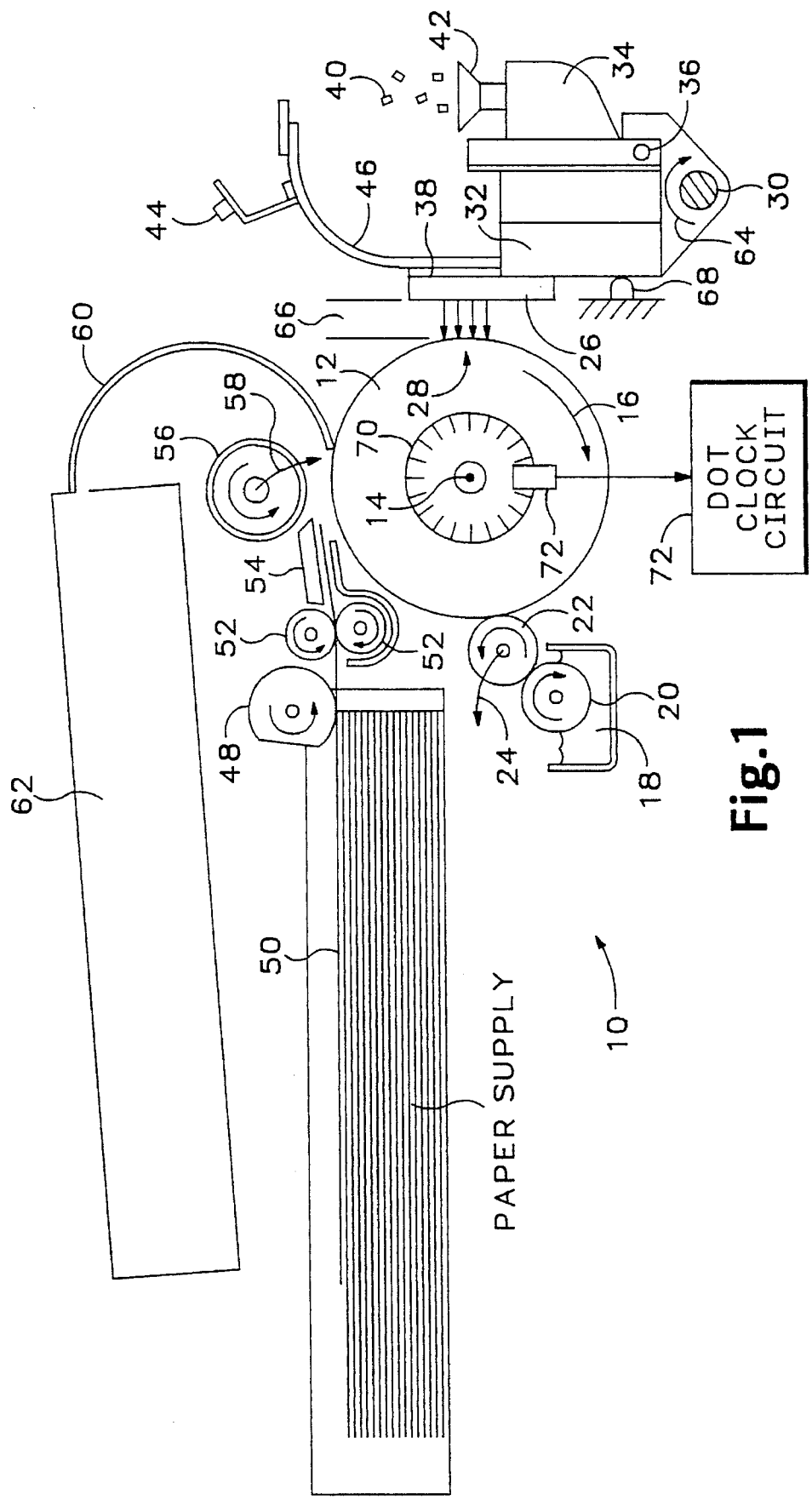
FIG. 1 is a simplified side pictorial view showing an image transfer ink-jet printer, such as one employing this invention.

FIG. 1 shows a transfer printing phase-change ink-jet printer 10 (hereafter "printer 10") that is but one type of ink-jet printer suitable for use with this invention. Printer 10 is described in co-pending U.S. Application Ser. No. 08/206,998 filed Mar. 7, 1994 for PRINTER PRINT HEAD POSITIONING APPARATUS AND METHOD, which is assigned to the assignee of this application and which is incorporated herein by reference. Printer 10 prints an image according to the following sequence of operations.

A transfer drum 12 rotates about an axis of rotation 14 in a direction indicated by arrow 16. Prior to printing, drum 12 is wetted with a transfer fluid 18 by transfer fluid applicator rollers 20 and 22 after which transfer fluid applicator roller 22 is moved away from drum 12 in a direction indicated by arrow 24. Alternatively, transfer fluid 18 may be selectively applied to drum 12 with a movable wick. An ink-jet print head 26 spans the width of drum 12 with four vertically Spaced apart nozzle arrays (shown generally at 28). Nozzle arrays 28 eject, respectively, yellow Y, magenta M, cyan C, and black K phase-change ink. (When necessary hereafter, numbered elements will be further identified by a letter indicating the color of ink carried by the element. For example, nozzle array 28C is a cyan ink ejecting nozzle array.)

Nozzle arrays 28 each have nozzles spaced apart horizontally by 2.37 millimeters (28×0.0847 millimeter pixel spaces) in support of a nominal 118 dot per centimeter printing resolution. Each array of nozzle arrays 28 is aligned parallel with axis of rotation 14, and nozzle arrays 28Y, 28M, and 28C are aligned vertically such that corresponding nozzles in each array print on a same scan line. Nozzle array 28K is offset horizontally by two pixel spaces from corresponding nozzles in the other arrays.

Printing a preferred interlaced image pattern on drum 12 entails moving print head 26 in 27 increments (one during each rotation of drum 12) in a direction parallel to axis of rotation 14. The 27 increments include 13 two-pixel increments, one three-pixel increment, and 13 more two-pixel increments that together move print head 26 a total lateral distance of 55 pixels (4.656 millimeters), which is two pixels short of the inter-nozzle spacing in order to prevent over-printing a previously printed scan line. The three-pixel print head increment is necessary to provide proper interlacing with the preferred nozzle spacing in print head 26.

The required lateral movement is accomplished by securing print head 26 (and associated components) to a shaft 30 that is moved laterally by a print head positioner (not shown).

Print head 26, preferably a type that ejects phase-change ink, is mounted to an ink reservoir 32, which together with four ink premelt chambers 34 (one shown), is secured to shaft 30. Reservoir 32 and premelt chambers 34 are heated by a reservoir heater 36, and print head 26 is separately heated by a print head heater 38. Four colors of solid phase-change inks 40 (one color shown) are fed through four funnels 42 (one shown) to premelt chambers 34 where solid inks 40 are melted by reservoir heater 36 for distribution to print head 26.

Piezoelectric transducers positioned on print head 26 receive image data from drivers 44 mounted on a flex circuit 46. Print head 26 ejects controlled patterns of cyan, yellow, magenta, and black ink toward rotating drum 12 in response to the image data, thereby depositing a complete image on the wetted surface of drum 12 during 27 sequential rotations of drum 12. Repeating this process allows multiple ink layers to be placed on top of each other on the wetted surface of drum 12 to obtain greater color saturation when the image is transferred to a transparent substrate or transparency film type of print media.

A media feed roller 48 delivers a print medium 50 to a pair of media feed rollers 52, which advance print medium 50, such as plain paper or transparency film, past a media preheater 54 and into a nip formed between drum 12 and a transfer roller 56. Transfer roller 56 is moved into pressure contact with drum 12 as indicated by an arrow 58. A combination of pressure in the nip and heat from print medium 50 causes the deposited image to transfer from drum 12 and fuse to print medium 50. Image transferring heat is also provided by heating drum 12. Printed print medium 50 advances into an exit path 60 from which it is deposited in a media output tray 62.

After the image transfer is completed, transfer roller 56 moves away from drum 12 and transfer fluid applicator roller 22 moves into contact with and conditions drum 12 for receiving another image.

To maintain print quality, print head 26 requires periodic cleaning and purging by a print head maintenance station (not shown). Print head maintenance is normally accomplished following cold start-up of printer 10 and proceeds by rotating print head 26 on shaft 30 away from drum 12 in a direction indicated by an arrow 64. When print head 26 is a sufficient distance from drum 12, the maintenance station is moved into a position adjacent to print head 26. After maintenance, print head 26 is rotated back to a printing distance 66 from drum 12 that is determined by a stop 68 against which ink reservoir 32 slidably rests.

Figure 2:
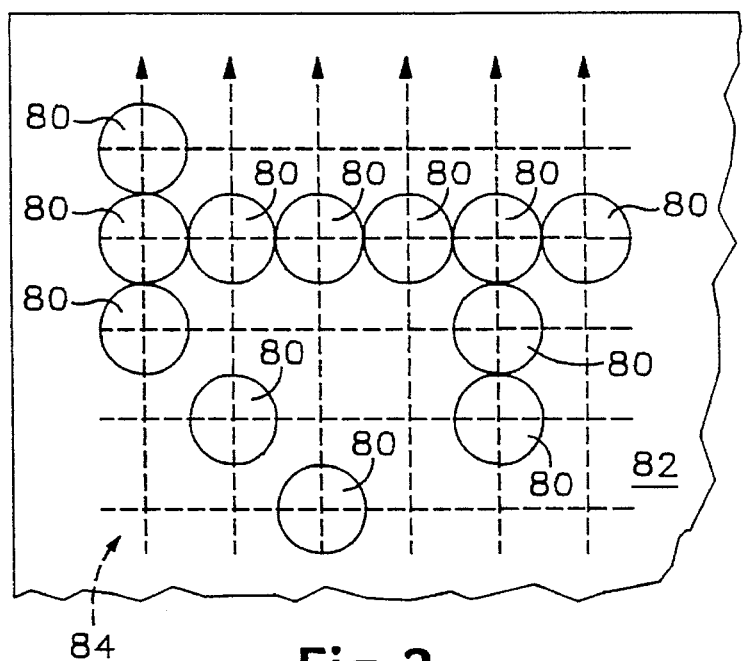
FIG. 2 is an enlarged fragmentary plan view of a print medium showing ink drops deposited thereon in a prior art uniform grid pattern.

Referring to FIG. 2, prior art printers follow the conventional wisdom that ink drops 80 must be deposited on a print medium 82 at addressable positions represented by a uniformly spaced grid pattern 84 (shown in dashed lines). Indeed, great care is typically taken to ensure the uniform positioning of ink drops 80. Therefore, printer 10 was originally designed with an encoder disk 70, a photo-optical detector 72, and a duty-cycle correcting dot clock circuit 74 functionally similar to one described in U.S. Pat. No. 5,170,416 issued Dec. 8, 1992 for ENCODER DUTY-CYCLE ERROR CORRECTOR, which is assigned to the assignee of this application.

Figure 3:
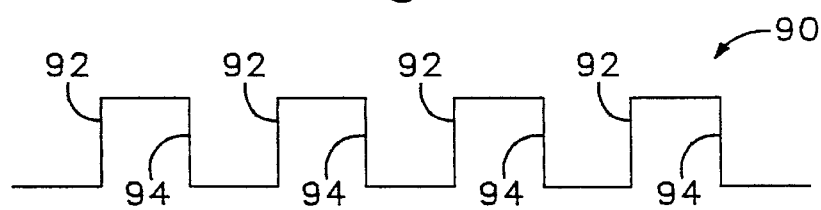
FIG. 3 is an electrical waveform diagram showing a prior art dot clock signal.

FIG. 3 shows a dot clock signal 90 generated by dot clock circuit 74. Dot clock signal 90 includes odd- and even-numbered transitions 92 and 94 that are uniformly spaced apart in time to produce a symmetrical, 50 percent duty-cycle signal. Dot clock signal 90 triggered the ejection of ink drops 80 from print head 26 in response to dot clock transitions 92 and 94 such that ink drops 80 were deposited on drum 12 in grid pattern 82 at a preferred resolution of 118 dots per centimeter (300 dots per inch).

Figure 4:
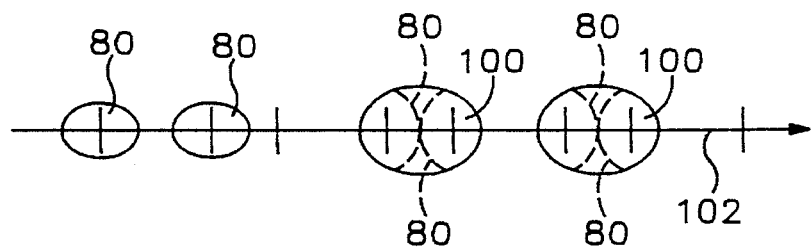
FIG. 4 is an enlarged fragmentary plan view showing ink drops deposited along a scan line in a nonuniformly spaced apart manner such that adjacent pairs of ink drops coalesce according to this invention.

During ensuing development of printer 10, a series of multilayer test images were being made on a transparency film type of print media to evaluate their suitability in an overhead projection application. Part way through the test, the test images began exhibiting reduced ink flow without bumps, strands, and multiple pixel displacements or gross distortions of the ink. As represented in FIG. 4, a 25 to 100 times magnified optical microscope examination of the improved test images revealed that pairs 100 of overlapping adjacent ink drops 80 (shown in dashed lines) in each scan line 102 (one shown) had coalesced in a repeating pattern. Moreover, coalesced adjacent pairs 100 of ink drops had a substantially different shape that was conducive to allowing the ink drops to expand during transfer from the wetted surface of drum 12 to the transparent substrate or film in a distortion-free manner preserving the jetted pattern. The transferred ink images had a flattened surface from the transfer process that permitted light to rectilinearly pass through the ink to achieve overhead transparency projection without significant light dispersal.

Figure 5:
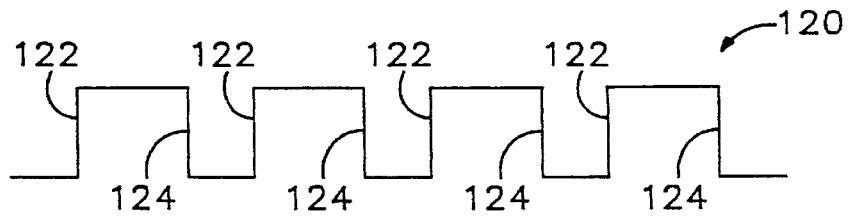
FIG. 5 is an electrical waveform diagram showing an asymmetrical dot clock signal of this invention.

The cause of the coalescence pattern was traced to a malfunction in dot clock circuit 74 that caused an unexpected generation of an asymmetrical dot clock signal 120 as represented in FIG. 5. As before, odd- and even-numbered transitions 122 and 124 are each used to trigger ejection of ink drops from print head 26. However, even-numbered transitions 124 were unintentionally time delayed causing reduced spacing between, and coalescence of, alternating pairs of ink drops.

Figure 6:
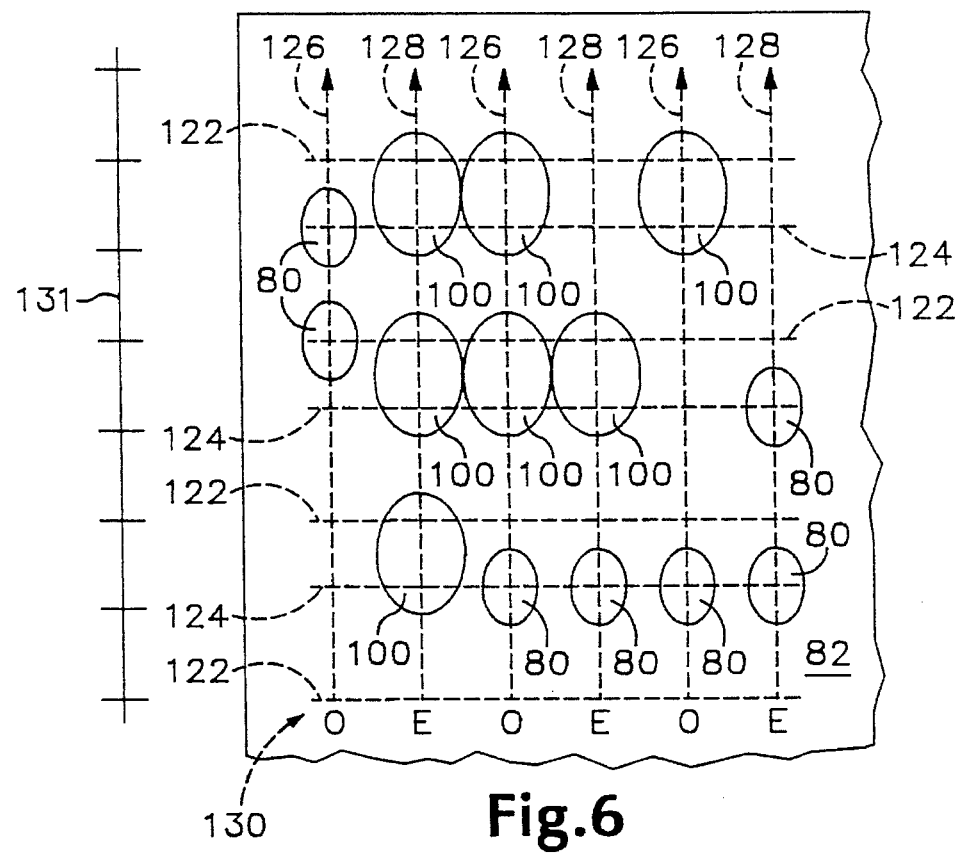
FIG. 6 is an enlarged fragmentary plan view of a print medium showing individual and coalesced pairs of ink drops deposited thereon in a uniform but asymmetrically spaced grid pattern of this invention.

Referring to FIGS. 5 and 6, subsequent development revealed that additional improvements in image quality were possible if dot clock circuit 74 was improved to control the amount of offset in the duty-cycle of asymmetrical dot clock signal 120 such that even-numbered transitions 124 are time delayed by a controlled amount on odd-numbered scan lines 126 and even-numbered scan lines 128 in accordance with a regular but asymmetrically spaced addressability pattern 130 (shown in dashed lines). A uniformly spaced time reference scale 131 is shown adjacent to print medium 82 to represent undelayed dot clock transition times.

Figure 7:
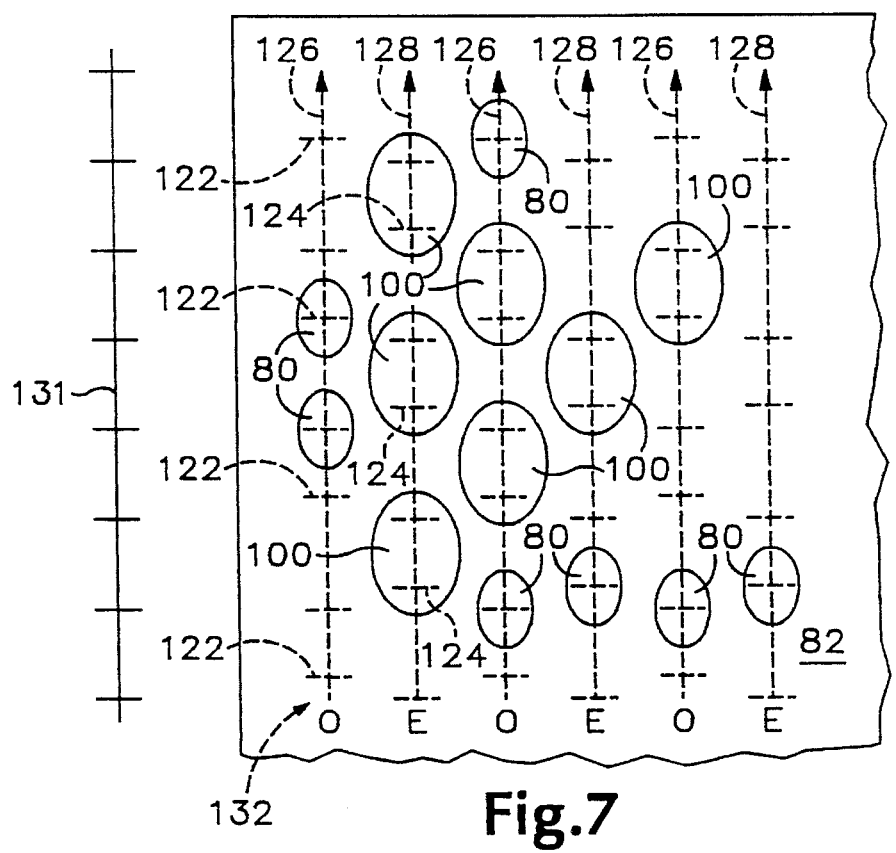
FIG. 7 is an enlarged fragmentary plan view of a print medium showing individual and coalesced pairs of ink drops deposited thereon in a staggered and asymmetrically spaced pattern of this invention.

Alternatively as shown in FIGS. 5 and 7, even-numbered transitions 124 are time delayed on even-numbered scan lines 128, and odd-numbered transitions 122 are time delayed on odd-numbered scan lines 126 in accordance with a staggered and asymmetrically spaced ink drop addressability pattern 132(Shown in dashed lines). Addressability patterns 130 and 132 are not actually printed on print medium 82 but merely represent ink drop positioning patterns that are controlled by asymmetrical dot clock signal 120.

Test images printed with ink drop addressability patterns 130 and 132 indicated that pattern 130 is preferred. The tests also indicated that patterns 130 and 132 slightly degrade textual images and fine lines. Because black ink is opaque and is not used to print secondary colors, multilayer black printing is preferably not employed and the invention may be disabled when printing black ink.

While not tested, it is anticipated that a different amount of time delay might be optimal for each printed color and/or for each media type. It is, therefore, preferred that the time delay value be programmable.

Staggered ink drop addressability pattern 132 is easily implemented in an interlaced printer such as printer 10 in which multiple odd-numbered scan lines 126 are generated during a first set of drum 12 rotations and multiple even-numbered scan lines 128 are generated during a second set of drum 12 rotations.

The desirable coalescence properties of this invention are exhibited most notably by phase change inks because of their relatively high viscosity, adhesive properties, and state changes as a function of the rate of ink temperature change. Phase change ink compositions particularly suitable for use with this invention are described in U.S. Pat. No. 4,889,560 issued Dec. 26, 1989 for PHASE CHANGE INK COMPOSITION AND PHASE CHANGE INK PRODUCED THEREFROM and copending U.S. patent application Ser. No. 07/981,677 filed Nov. 25, 1992 for PROCESS FOR APPLYING SELECTIVE PHASE CHANGE INK COMPOSITIONS TO SUBSTRATES IN INDIRECT PRINTING PROCESSES, both of which are assigned to the assignee of this application and incorporated herein by reference. Of course, the invention is not limited to these ink compositions, and other ink compositions, including liquid inks, could also be used to achieve various print quality improvements.

Figure 8:
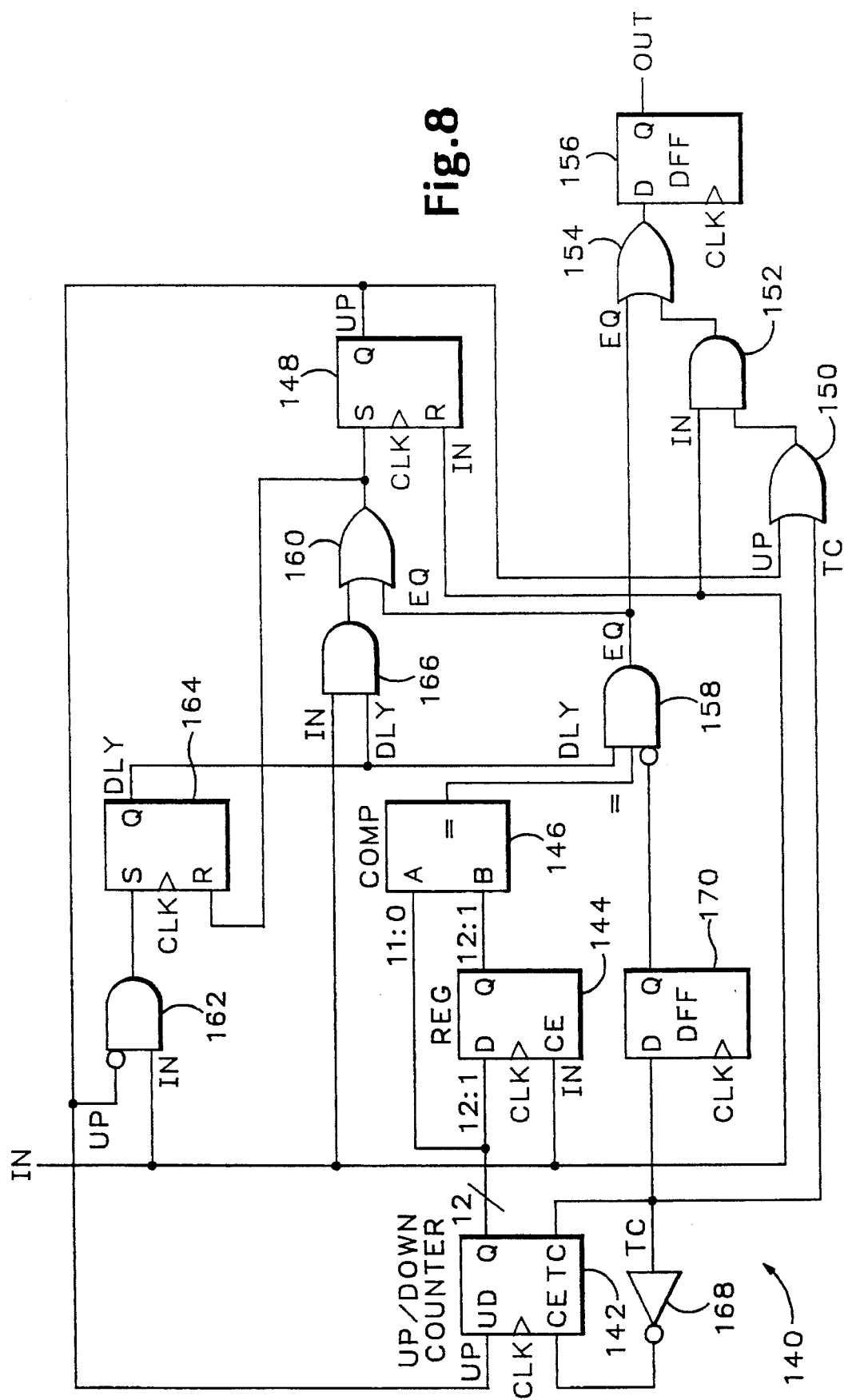
FIG. 8 is a schematic electrical circuit diagram of an improved encoder duty-cycle correction circuit of this invention.

FIG. 8 shows a duty-cycle correction circuit 140 (hereafter "circuit 140") that is an improvement over a prior circuit described in U.S. Pat. No. 5,170,416. It does not require disabling when an encoder input signal is at a rate that is too slow for correction. Rather, circuit 140 gracefully degrades to generating an uncorrected dot clock signal whereas the prior circuit required disabling to prevent internal counters from overflowing. Slow encoder signal rates are possible during changes of print head direction in bidirectionally scanned printers or during periods when a print head, print drum, or the like are starting, stopping, or changing direction. Also, circuit 40 always delays whichever encoder signal transition is early. The prior circuit could generate corrected transitions either earlier or later than the original encoder signal transitions, thereby unduly complicating downstream logic circuits associated with drum positioning and print window generation.

In particular, circuit 140 is based on a 12 -bit up/down counter 142, a data register 144, an equal comparator 146, and associated control logic. Circuit 140 is synchronously clocked by a 4 MHz clock signal "CLK." Skilled workers will recognize that CLK may operate at any compatible frequency. Circuit 140 receives an input signal "IN" that is generated in response to each transition of the encoder signal and which preferably consists of a single CLK period pulse for each transition. Circuit 140 generates an output signal "OUT" that is a train of single CLK period pulses having approximately even spacing.

Up/down counter 142 initially counts up until an IN pulse is received that resets a set/reset flip flop 148 that controls the counting direction of up/down counter 142. The IN pulse is also logically steered through gates 150, 152, and 154 to the "D" input of a flip flop 156. On the next CLK cycle, flip flop 156 generates an OUT pulse and flip flop 148 causes up/down counter 142 to start counting down. If up/down counter 142 is still nonzero when the next IN pulse is received, the IN pulse loads the counter value into data register 144 right shifted by 1 bit. Thereby, the "Q" output of data register 144 holds the stored value of up/down counter 142 divided by two which is compared by comparator 146 with the current value of up/down counter 142, which continues counting down until its value equals the value stored in data register 144. At that time and equal pulse "EQ" is generated by a gate 158 and directed through gate 154 to flip flop 156, which generates an OUT pulse. EQ is also directed through a gate 160 to set/reset flip flop 148, which causes up/down counter 142 to count up again.

The description above assumes that the second IN pulse is an early pulse of a pair of IN pulses and, therefore, the pulse that needs timing correction. However, if the second IN pulse is late rather than early, then up/down counter 142 might be counting up when an early IN pulse is received and will then count down to zero before the next late IN pulse is received. When this condition occurs it is detected by a gate 162 and a set/reset flip flop 164 which sends a delay signal "DLY" to a gate 166 and to gate 158 to prevent set/reset flip flop 148 from being set. When at zero, up/down counter 142 generates a terminal count signal "TC" which is inverted by an invertor 168 to hold up/down counter 142 at zero. On the next CLK pulse, TC causes a flip flop 170 to send a signal through gates 158 and 160 to reset set/reset flip flop 164, which removes the DLY signal from gates 158 and 166. The next IN pulse received passes through gates 166 and 160 to set set/reset flip flop 148 which causes up/down counter 142 to count up again. The action of set/reset flip flop 164 causes circuit 140 to operate on the correct phase of the IN signal so that the later IN pulse of each pair is received when up/down counter 142 is counting up and the earlier IN pulse is received when up/down counter 142 is counting down.

Figure 9:
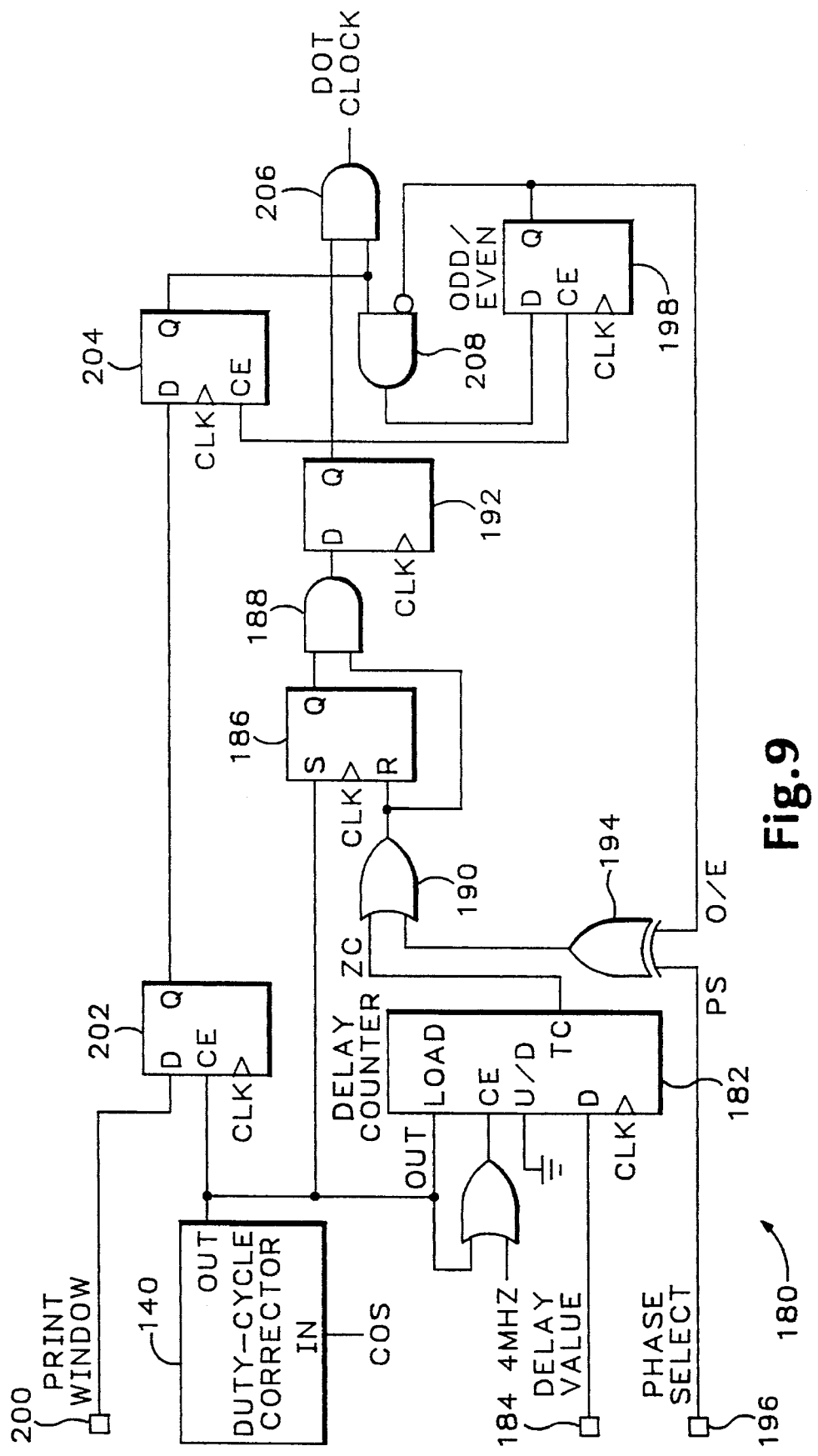
FIG. 9 is a simplified schematic electrical block diagram of a dot clock circuit of this invention that includes a programmable clock transition delay circuit and the duty-cycle correction circuit of FIG. 8.

FIG. 9 shows a dot clock circuit 180 that receives the evenly spaced OUT pulses from circuit 140 and imparts a programmable amount of delay time to selectable ones of the OUT pulses to cause ink drop coalescence as shown in FIG. 7.

In particular, a delay counter 182 receives a delay value from a processor bus port 184. A first OUT pulse received causes the delay value to be loaded into delay counter 182, which starts counting down at a 4 MHz rate. 4 MHz was chosen to provide a reasonable range of delay values consistent with the number of bits in delay counter 182. Skilled workers will recognize that many other counting rates are possible. The first OUT pulse also sets a set/reset flip flop 186, which enables one input of a gate 188. Delay counter 182 counts down until reaching zero at which time it generates a zero count signal "ZC," which propagates through a gate 190 to the other input of gate 188, which then sets the D input of a flip flop 192 to a logic one state. During the next CLK period, flip flop 192 generates a delayed dot clock pulse, and set/reset flip flop 186 is reset.

The description above assumes that an "XOR" gate 194 was generating a logic zero state in response to a phase select signal "PS" received from a processor bus port 196 and an odd/even signal "O/E" received from a flip flop 198. The logic zero state allowed signal ZC to pass through gate 190 to gate 188 to generate the delayed dot clock pulse.

If instead XOR gate 194 had been generating a logic one state, the state of signal ZC would be moot and set/reset flip flop 186 would reset, thereby sending a logic zero state to one input of gate 188. However, under these conditions, the other input of gate 188 is in a one state and the next OUT pulse from circuit 140 sets set/reset flip flop 186, sending a logic one signal through gate 188 to flip flop 192, which during the next CLK pulse generates an undelayed dot clock signal.

Therefore, the output state of XOR gate 194 determines whether a particular dot clock pulse is delayed. Because flip flop 198 alternates states in response to each dot clock pulse, XOR gate 194 likewise alternates states, thereby causing alternate dot clock pulses to be delayed. If the state of phase select signal PS is changed, the opposite set of alternating dot clock pulses will be delayed. Therefore, either even or odd sets of dot clock pulses can be selectively delayed by an amount determined by the delay value loaded into delay counter 182.

Dot clock circuit 180 is enabled and disabled in response to a print window signal received from a processor bus port 200. The print window signal is in a logic one state during periods when a print head is properly positioned for printing relative to a print receiving medium. For example, referring printer 10 of FIG. 1, drum 12 receives from print head 26 a portion of an image printed along a first set of scan lines while rotating around axis of rotation 14. During each successive rotation of drum 12, print head 26 is moved laterally and receives a successive portion of the image printed along successive sets of scan lines until the entire image is received by drum 12. The print window signal is synchronized with the rotation of drum 12 such that each portion of the image is properly aligned to begin and end at the same rotational angles of drum 12.

The print window signal is synchronized by flip flops 202 and 204 to pulses from duty-cycle corrector circuit 140 and flip flop 192. Flip flop 204 synchronously enables and disables the dot clock signal and flip flop 198 O/E signal by employing gates 206 and 208.

Skilled workers will recognize that portions of this invention may have alternative embodiments. For example, this invention may also be used in direct image transfer printing, bidirectional printing, liquid ink printing, or plain paper printing. The image receiving scan lines may be traced by a single nozzle ink-jet print head or by any operable nozzle array configuration of an ink-jet print head. Printing may be accomplished by any means that moves a print head relative to an image receiving surface, such as a bidirectionally scanning print head moving relative to a stationary print medium. The invention is applicable to a variety of print interlacing schemes and to non-interlaced printing as well.

Encoder 70 is not limited to an optical disk but may be implemented with any optical, magnetic, or mechanical indicia detectable on a rotary of linear encoder or other suitable mechanism coupled to an image defining moving body, such as a drum, a print head or print head carriage, a drive motor, a drive coupling, or a print medium.

Any suitable encoder pitch may be employed and may have other than one-half the desired resolution. For example, one-quarter pitch (or less) may be employed, and two (or more) duty-cycle corrector circuits may be connected in series to generate four (or more) dot clock pulses per encoder transition. A pulse selection circuit may be employed to generate dot clock pulses derived from selected ones of the multiple pulses. Alternatively, an encoder with unevenly spaced detectable indicia could be employed to either delay or accelerate predetermined dot clock signal transitions to achieve a desired ink drop coalescence pattern.

A variety of duty-cycle correcting and dot clock generating circuits may be employed including ones that employ analog delay circuits or software controlled ink drop ejection timing. In circuits 140 and 180, skilled workers will realize that the odd and even sense of the clock transitions and logic states may be swapped and the circuits modified in a variety of ways to perform equivalent functions that are still within the spirit of this invention. Also, dot clock correction can be achieved by initially squaring up an input signal with a set of counter circuits to make the pulses which would eject dots of ink evenly spaced and then subtracting an offset to make the positive portion of the resulting rectangular signal of shorter duration to result in pulses that pair the drops in drop placement.

Of course, image postprocessing may still be employed with this invention to provide additional control over final printing quality.

It will be obvious to those having skill in the art that many changes may be made to the details of the above-described embodiments of this invention without departing from the underlying principles thereof. Accordingly, it will be appreciated that this invention is also applicable to ink drop placement and mechanism positioning applications other than those found in phase change ink-jet printers. The scope of the present invention should, therefore, be determined only by the following claims.

We claim:

1. A method for improving quality of a print by controlling positioning of phase change ink drops on it print medium in an ink-jet printer having a print head and a print medium that undergo relative movement when producing the print, comprising the steps of:

moving at least one of the print head and the print medium such that the relative movement follows an initial scan line in a single direction along the print medium;

receiving an encoder signal having odd- and even-numbered transitions indicative of incremental positions of the relative movement;

generating in response to the encoder signal a dot clock having odd- and even-numbered transitions characterized by an asymmetrical timing relationship; and ejecting a set of the phase change ink drops from the ink-jet print head in response to the asymmetrical timing relationship of the dot clock, the set of the phase change ink drops being deposited in an asymmetrically spaced apart pattern along the scan line on the print medium such that more closely spaced apart pairs of adjacent ones of the set of the phase change ink drops form initial coalesced pairs of the phase change ink drops.

2. The method of claim 1 further including:

detecting incremental changes in the relative movement with an encoder coupled to at least one of the print head and the print medium;

generating from the detected incremental changes an encoder clock having odd- and even-numbered transitions characterized by an inherent asymmetrical timing relationship of the encoder; and correcting the inherent asymmetrical timing relationship to generate the odd- and even-numbered transitions in the encoder signal that have a substantially symmetrical timing relationship.

3. The method of claim 1 in which the generating step includes:

selecting the odd- and even-numbered transitions of the encoder signal;

applying substantially no time delay to the odd-numbered transitions of the encoder signal; and applying a predetermined time delay to the even-numbered transitions of the encoder signal.

4. The method of claim 3 in which the predetermined time delay has a value that is selectable by a processor.

5. The method of claim 1 further comprising:

moving at least one of the print head and the print medium such that the relative movement follows an additional scan line in a single direction along the print medium, the additional scan line being adjacent to the initial scan line;

changing the dot clock after depositing the set of the phase change ink drops along the scan line such that the odd- and even-numbered transitions of the dot clock have an additional asymmetrical timing relationship; and ejecting an additional set of the phase change ink drops from the ink-jet print head in response to the additional timing relationship of the dot clock, the additional set of the phase change ink drops being deposited in an asymmetrically spaced apart pattern along the additional scan line such that more closely spaced pairs of adjacent ones of the additional set of the phase change ink drops deposited along the additional scan line form additional coalesced pairs of the phase change ink drops.

6. The method of claim 5 in which adjacent ones of the initial and additional coalesced pairs of the phase change ink drops are offset from one another in the single direction.

7. The method of claim 1 in which the coalesced pairs of the phase change ink drops have a shape suitable for registering multiple layers of the coalesced pairs of the phase change ink drops.

8. The method of claim 7 in which the print medium is a transparency film, and the shape of the coalesced pairs of the phase change ink drops transmits light in a substantially rectilinear manner.

9. An apparatus for improving quality of a print by controlling positioning of phase change ink drops on a print medium in a ink-jet printer having a print head and a print medium that undergo relative movement when producing a print, comprising:

moving means for moving at least one of the print head and the print medium such that the relative movement follows an initial scan line in a single direction along the print medium;

an encoder generating encoder pulses indicative of incremental positions of the relative movement;

a dot clock circuit generating a dot clock in response to the encoder pulses, the dot clock having odd- and even-numbered transitions characterized by an initial asymmetrical timing relationship; and the print head ejecting an initial set of the phase change ink drops in response to the initial asymmetrical timing relationship of the dot clock, the initial set of the phase change ink drops being deposited in an asymmetrically spaced apart pattern along the initial scan line on the print medium such that more closely spaced apart pairs of adjacent ones of the initial set of the phase change ink drops form initial coalesced pairs of the phase change ink drops.

10. The apparatus of claim 9 in which the encoder is mechanically coupled to at least one of the print head and the print medium and electrically coupled to the dot clock circuit such that the encoder pulses have an asymmetrical timing relationship, and in which the dot clock circuit further includes an encoder duty-cycle corrector circuit that corrects the asymmetrical timing relationship of the encoder pulses such that an encoder signal is generated that has a substantially symmetrical timing relationship.

11. The apparatus of claim 10 in which the dot clock circuit selects odd-numbered and even-numbered transitions of the encoder signal, applies a substantially zero time delay to the odd-numbered transitions, and applies a predetermined time delay to the even-numbered transitions to generate the dot clock.

12. The apparatus of claim 11 in which the predetermined time delay has a value that is selectable by a processor.

13. The apparatus of claim 9 further comprising:

the moving means moving at least one of the print head and the print medium such that the relative movement follows all additional scan line in a single direction along the print medium, the additional scan line being adjacent to the initial scan line;

the dot clock circuit generating during the relative movement along the additional scan line an altered dot clock in response to the encoder pulses, the altered dot clock having altered transitions characterized by an additional asymmetrical timing relationship; and the print head ejecting an additional set of the phase change ink drops in response to the altered transitions, the additional set of the phase change ink drops being deposited in an asymmetrically spaced apart pattern along the additional scan line such that more closely spaced apart pairs of adjacent ones of the additional set of the phase change ink drops on the additional scan line form additional coalesced pairs of the phase change ink drops.

14. The apparatus of claim 13 in which adjacent ones of the initial and additional coalesced pairs of the phase change ink drops are offset from one another in the single direction.

15. The apparatus of claim 9 in which the coalesced pairs of the phase change ink drops have a shape suitable for registering multiple layers of the coalesced pairs of the phase change ink drops.

16. The apparatus of claim 15 in which the print medium is a transparency film, and the shape of the coalesced pairs of the phase change ink drops transmits light in a substantially rectilinear manner.

17. An apparatus for improving quality of a color print by controlling positioning of multiple layers of phase change ink drops on a print medium in a color ink-jet printer having a print head and a print medium that undergo relative movement when producing a color print, comprising:

moving means for moving at least one of the print head and the print medium such that the relative movement follows an initial scan line in a single direction along the print medium;

an encoder coupled to at least one of the print head and the print medium and providing encoder pulses indicative of the relative movement;

a clock circuit receiving the encoder pulses and generating asymmetrically spaced apart position pulses in response to symmetrical incremental positions of the relative movement;

the print head ejecting in response to the asymmetrically spaced apart position pulses a first layer of the phase change ink drops having a first color, the first layer of the phase change ink drops being deposited in an asymmetrically spaced apart pattern along a first scan line on the print medium such that more closely spaced apart pairs of adjacent ones of the phase change ink drops form first coalesced pairs of the phase change ink drops; and the print head ejecting in response to the asymmetrical position pulses a second layer of the phase change ink drops having a second color, the second layer of the phase change ink drops forming second coalesced pairs of the phase change ink drops that are registered along the initial scan line and on top of the first coalesced pairs of the phase change ink drops.

18. The apparatus of claim 17 in which the print medium is a transparency film.

19. The apparatus of claim 17 in which the clock circuit generates the asymmetrically spaced apart position pulses by applying a predetermined time delay to selected ones of the encoder pulses.

20. The apparatus of claim 19 in which the predetermined time delay has a value that is selectable by a processor.

21. The apparatus of claim 19 in which the predetermined time delay has a value that is a function of the color of at least one of the first and second coalesced pairs of the phase change ink drops.

22. The apparatus of claim 19 in which the print head further ejects along an additional scan line a third layer of phase change ink drops having a black color and the predetermined time delay is substantially zero such that the black phase change ink drops are deposited in a substantially symmetrically spaced apart pattern along the additional scan line on the print medium, the third layer of phase change ink drops not registered with any phase change ink drops of the first and second layers.

* * * * *

UNITED STATES PATENT AND TRADEMARK OFFICE
CERTIFICATE OF CORRECTION

PATENT NO : 5,600,352
DATED : February 4, 1997
INVENTOR(S) : David L. Knierim and Mark R. Parker It is certified that error appears in the above-identified patent and that said Letters Patent are hereby corrected as shown below:

Column 11 at line 26, delete "it" and insert "a";

Column 12 at line 12, after "the" and before "scan" insert -- initial --;

Column 13 at line 14, delete "all" and insert -- an --.

Signed and Sealed this

Tenth Day of June, 1997

BRUCE LEHMAN

*Attest:*

*Attesting Officer*

*Commissioner of Patents and Trademarks*